United States Patent Office.

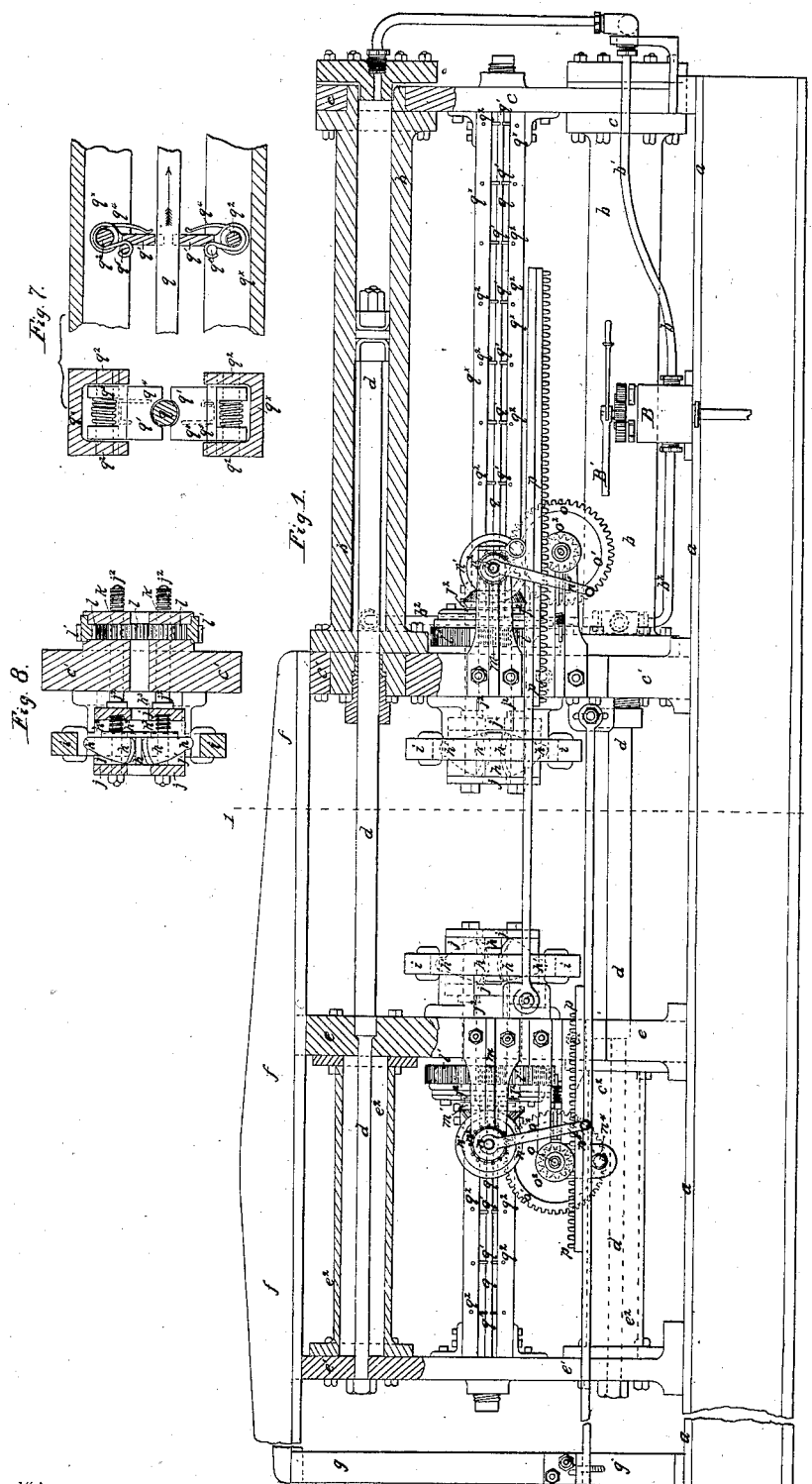

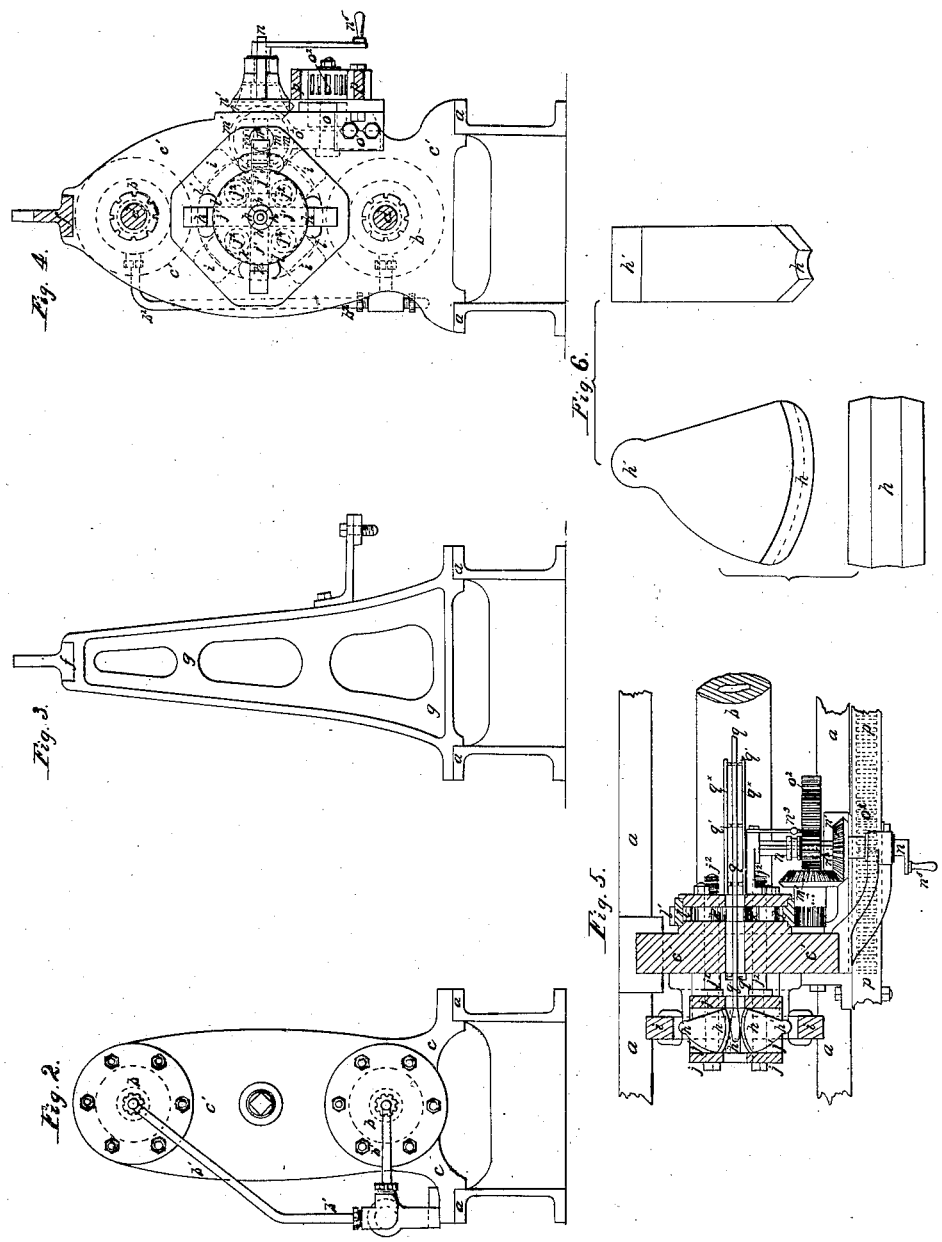

GUSTAVUS PALMER HARDING, OF CHISWICK, ENGLAND.

*Letters Patent No. 73,715, dated January 28, 1868; patented in England, September 14, 1865.*

IMPROVED APPARATUS FOR DRAWING TAPERED TUBES.

*The Schedule referred to in these Letters Patent and making part of the same.*

TO ALL TO WHOM IT MAY CONCERN:

Be it known that I, GUSTAVUS PALMER HARDING, of Bohemia House, Chiswick, in the county of Middlesex, England, a subject of the Queen of Great Britain, have invented or discovered new and useful "Improvements in the Manufacture of Tubes for Gun-Barrels and other purposes, parts of which improvements are also applicable to the manufacture of rods or bars, and to the rifling of ordnance and fire-arms;" and I, the said GUSTAVUS PALMER HARDING, do hereby declare the nature of the said invention, and in what manner the same is to be performed, to be particularly described and ascertained in and by the following statement thereof; that is to say—

My invention has for its object improvements in the manufacture of tubes for gun-barrels and other purposes.

Heretofore it has been a common practice, in the manufacture of tapered tubes, to employ a pair of rolls having a number of tapered grooves formed on their surfaces, by which means, aided by an internal mandrel, tubes have been rolled to the form of the grooves in such rolls; and in other cases tubes have been drawn between dies, consisting of grooved rollers or grooved segments of rollers, the diameter of the passage between such sections being progressively varied as tubes are drawn between or through them.

It has also been proposed to employ an expanding-die or wordle, composed of a number of plates sliding in suitable guides at right angles to the direction of the draw, and caused gradually to approach or recede from each other in the working of the machinery, such expanding-die being employed to produce either cylindrical or tapered tubes or rods.

Now, my invention consists in the employment of dies or wordles composed of a number (two or more) of segmental dies or rollers, having tapered or other-shaped grooves formed on their peripheries, such segmental dies or rollers meeting at their peripheries, and there producing a die of a truly circular or other desired form; and in order that no rib or fin may be produced on the tube or rod being drawn, I prefer to form the edges of the segmental dies, where they touch each other, of a corrugated or irregular form. These segments are placed radially, with their peripherie converging to a central point, and capable of turning upon bearings in a frame fixed to a flange on the hydraulic cylinder, to the ram or piston of which, according to one arrangement, the tubes to be drawn are fixed. The segmental dies are confined to work within grooves formed in a frame, which is caused to recede from or approach to the centre of the frame within which the centres upon which the segments turn are situated, by means of a train of gearing set in motion by a rack acting thereon during the traverse of the hydraulic cylinder. I prefer, in carrying out my invention, to work the expanding-dies or wordles, each consisting of a set of segments in pairs, in one machine, each die or wordle in turn acting as a gripe to hold the tube and to draw it through the other die or wordle. For this purpose the changing-gear of the die or wordle then acting as a gripe will be put out of gear, and the segments of which the die is composed will approach each other until they have sufficient gripe of the tube to hold it whilst it is being drawn. In this arrangement I find it convenient to employ a pair of hydraulic or hydrostatic cylinders mounted in a suitable framing, one die or wordle being supported in a cross-frame between the heads of the cylinders, the other die or wordle being mounted in a cross-head connecting together the ends of the piston-rods. In this case there will be two racks and two sets of gearing to work the two dies or wordles, the one set being carried by the cross-head connecting the two piston-rods, whilst the other set is carried by the cross-frame connecting together the hydraulic cylinder; the mandrel on the one side being carried by a cross-frame connecting together the opposite ends of the cylinders, whilst the mandrel on the opposite side is held in another frame connected to the cross-head of the piston-rods. I employ supports mounted in a strong frame in the direction of the length of the mandrels, acting to give support to the stems of the mandrels whilst the tube is being forced over them, and thereby prevent the mandrels being bent or buckled, such supports being capable of giving way as the tube approaches them, and of returning, by means of springs or otherwise, to their normal position as the tube recedes therefrom.

When producing rods or bars according to this invention, the mandrels will be dispensed with. It will be readily understood that tubes or bars of other or irregular forms or tapers may be produced according to my invention by employing segments of dies having corresponding forms of grooves formed thereon.

Having thus stated the nature of my invention, I will proceed more fully to describe the manner of performing the same.

Description of the Drawings.

Figure 1 is a side view, partly in section, of a machine constructed according to the first part of my invention.

Figures 2 and 3 are two end views.

Figure 4 is a cross-section on the line 1 1, fig. 1.

Figure 5 is a sectional plan of parts of the machine; and

Figures 6 and 7 are views to a larger scale of some of the parts separately.

$a\,a$ is the bed-plate of the machine. $b\,b$ are two hydraulic cylinders carried by the standards $c\,c^1$, which are firmly fixed to the bed-plate $a\,a$. The piston-rods $d\,d$ are stepped into the cross-head or frame $c$, and thence pass to the cross-head or frame $e^1$, to which they are firmly secured, as shown, or by other suitable means. The cross-heads or standards $e\,e^1$ are connected together by the flanged tubes or cylinders $e^2\,e^2$ in such manner as to form a strong frame, which, in the action of the piston-rods $d\,d$, is caused to slide in the one or the other direction upon the bed-plate $a\,a$, the upper ends of the standards $e\,e^1$ being guided by the fixed guide-bar $f$, which is firmly connected to the standards $c^1$ and $g$. To the standard $c^1$, and between the cylinders $b\,b$, is fixed one die or wordle, and to the cross-head or frame $e$ is fixed another die or wordle, each of which, according to my invention, may be used alternately, as a gripe and as a die or wordle, to produce either parallel or tapered tubes or rods. Each of these dies or wordles is constructed and worked as follows: $h\,h$ are segments or portions of dies, each of which has formed on its periphery a tapered groove, (see fig. 6,) in such manner that when four or, it may be, other number of such segmental dies are placed together at their peripheries, they shall present the desired form of die or wordle. Each set of the segmental dies $h\,h$ is supported in a strong frame or box, $i$, within which they are capable of turning upon their centres or axes $h^1$ as they are moved in one or other direction by the box or frame $j$, within the grooves or slots $j^1$ of which the segmental dies are confined to work. Each of the frames $j$ is caused to move in one or the other direction in the following manner: To each of the frames $j$ are fixed four or, it may be, other number of rods, $j^2$, which have formed thereon screw-threads, which work within screw-nuts in the centres of toothed pinions $k$. The pinions $k$ take into and are driven by teeth, $l$, formed on the interior of a ring, the outer surface of which is also provided with teeth, $l^1$, which take into and are driven by a pinion, $m$, on the shaft or axis of which is also fixed a bevelled-toothed wheel, $m^1$, which is taken into by a bevelled-toothed wheel, $n^1$, on the shaft or axis $n$. Turning with this shaft or axis $n$ is a toothed pinion, $n^2$, which is capable of being moved into or out of gear with the toothed wheel $o^1$ on the axis $o$ by the lever-handle $n^3$. On the axis $o$ is also fixed a toothed pinion, $o^2$, which is taken into by a rack, $p$, from which it receives motion; and in order that the racks $p$ may be kept in gear with the pinions $o^2$, supporting-wheels, $n^4$, are employed, acting on the backs of the racks $p$ to press them towards the pinions $o^2$. One of the mandrels $q$ is fixed to the standard $c$, and the other mandrel is fixed to the cross-head or frame $e^1$; and in order to give support to a mandrel whilst a tube is being forced thereon, and thereby prevent bending or buckling of such mandrel, I employ supports, $q^1$, mounted on axes, $q^2$, in strong frames, $q^*$, in such manner that as the tube is being forced of the head of the mandrel, in the direction indicated by the arrow in fig. 7, the supports $q^1$ shall act to give support to the stem of the mandrel, and yet, when the tube comes up to the supports $q^1$, they shall successively turn upon their axes $q^2$, or otherwise move out of the way, to allow the tube to pass, and then, when the tube is being drawn in the contrary direction, they shall return to their normal position, in readiness again to offer support to the stem of the mandrel whilst a tube is being forced thereon. The mode in which these supports $q^1$ are constructed is shown more clearly at fig. 7, by which it will be seen that springs $q^4$ act to force the supports into their normal position against a pin, $q^5$, in readiness to offer support to the mandrel whilst a tube is being forced thereon, whilst such springs will allow of the supports $q^1$ moving out of the way of a tube, as already described. Water is supplied to one or other end of the cylinders $b\,b$ by means of pipes $b^1\,b^2$, the direction of the water being governed by suitable valves in the valve-box B, operated by a lever connected to the rod $B^1$, as is well understood; and in order that the machine may be capable of stopping itself, I place on the rod $B^1$ suitable stops, which are acted upon by projections on the sliding frame $e\,e^1\,e^2$. I have not, however, thought it necessary to show the means employed of stopping and starting the apparatus, nor the arrangement of valves in the valve-box B, as such will be readily understood and applied by any competent engineer.

I will now proceed to describe the mode in which the machinery will operate when drawing tapered tubes for gun-barrels or other purposes. I will suppose that the pistons $d\,d$ have moved to their furthest distance in the direction of the standard $g$. One end of a tube is inserted in one of the dies, say that fixed to the standard $c^1$. That die is then, by throwing the pinion $n^2$ out of gear with the wheel $o^1$, and by turning the handle $n^3$, caused to nip tightly the tube. The sliding frame containing the other die is then, in the action of the machinery, caused to approach the die which, for the time being, is acting as a grip. The tube will, by this means, be forced over the mandrel $q$ fixed to the standard $e^1$, each of the supports $q^1$ giving way as the end of the tube comes up to them in succession, until the tube has been forced on to the mandrel $q$ to its fullest extent. The frame $e$, carrying one of the dies, will then, by reversing the valves, be caused to separate from the frame or standard $c^1$, and by the rack $p$, acting on the gearing connected to the die, for the time acting as a die, will cause the frame $j$ to move outwards from the standard $e$ or $c^1$, and thereby gradually present a smaller and smaller orifice through which the tube is drawn. In some cases I propose to act on a length of tube sufficient to form two gun-barrels, and in this case the dies or wordles would alternately act as gripes or dies, so that whilst the one is acting as a gripe the other would be acting as a die, and *vice versa*. By removing the racks $p$, or by throwing the pinions $n^2$ out of gear with the wheels $o^1$, the dies can be set, by means of the handle $n^3$, to any position to draw parallel cylindrical tubes, and by removing the mandrels $q$, rods or bars may be drawn by the machinery.

Figure 8 represents a section of parts, showing a modification of the segmental dies and die-box. In this case the segmental dies $h$ are reduced in width, and at their backs are acted upon by a plate, $h^1$, pushed up by springs $h^3$ in such manner as to facilitate the introduction of a tube to be drawn, so that a tube, in being pushed into the die and on to the mandrel, will simply press back the segmental dies $h$; and when the tube is being drawn, the pressure exerted thereby against the segmental dies will cause them to firmly gripe the tube, so as to act either as a die or a gripe, as is desired, for the time being.

Having thus described the nature of the said invention, and the manner of performing the same, I would have it understood that I make no claim to the separate parts of the mechanism; nor do I confine myself to the precise details shown and explained; but

What I claim is, the combined arrangement herein described, with reference to figs. 1 to 8 of the drawings, consisting of the parts $h\ h\ i\ j\ j^1\ j^2$, with suitable gearing for giving motion thereto, when a tube or rod is being drawn by hydrostatic or other power, substantially as above described.

G. P. HARDING.

Witnesses:
G. F. WARREN, } both of No. 17 Gracechurch Street, London, E. C.
JOHN DEAN,